(12) United States Patent
Smith et al.

(10) Patent No.: US 10,225,077 B1
(45) Date of Patent: *Mar. 5, 2019

(54) SYMMETRIC DATA ENCRYPTION SYSTEM AND METHOD

(71) Applicant: OPEN PORTAL ENTERPRISES (OPE), Theodore, AL (US)

(72) Inventors: Joshua Norman Smith, Theodore, AL (US); Robert Chad McCollum, Theodore, AL (US)

(73) Assignee: OPEN PORTAL ENTERPRISES (OPE), Theodore, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/882,760

(22) Filed: Jan. 29, 2018

Related U.S. Application Data (63) Continuation of application No. 14/995,888, filed on Jan. 14, 2016, now Pat. No. 9,948,454.

(60) Provisional application No. 62/154,528, filed on Apr. 29, 2015, provisional application No. 62/173,085, filed on Jun. 9, 2015.

(51) Int. Cl.
*H04L 9/06* (2006.01)

(52) U.S. Cl.
CPC .................................. *H04L 9/065* (2013.01)

(58) Field of Classification Search
CPC ... H04N 7/1675; H04N 7/163; H04N 21/4405
USPC .......................................................... 380/28
See application file for complete search history.

(56) References Cited

U.S. PATENT DOCUMENTS

| 4,382,660 A | 5/1983 | Pratt, Jr. et al. |
| 4,729,111 A | 3/1988 | Arrathoon et al. |
| 4,888,724 A | 12/1989 | Marom et al. |
| 5,010,505 A | 4/1991 | Falk et al. |
| 5,239,173 A | 8/1993 | Yang |
| 5,446,579 A | 8/1995 | Lomashevitch |
| 5,646,395 A | 7/1997 | Miller |
| 5,770,851 A | 6/1998 | Park et al. |

(Continued)

FOREIGN PATENT DOCUMENTS

WO   2014087126 A1   6/2014

OTHER PUBLICATIONS

Abate, Tom, "Stanford Bioengineers Create Circuit Board Modeled on the Human Brain", Stanford Report, retrieved from: http://news.stanford.edu/pr/2014/pr-neurogrid-boahen-engineering-042814.html, Apr. 28, 2014, n.p., Aug. 22, 2017.

(Continued)

*Primary Examiner* — Evans Desrosiers
(74) *Attorney, Agent, or Firm* — Sughrue Mion, PLLC (57) ABSTRACT

A symmetric data encryption system configured to receive a data stream to be encoded; to relate segments of the data stream with a predetermined distortion-inducing amplitude of light to encrypt the data stream; to transmit the data stream; to decrypt the data stream by compensating for the value induced by the distortion-inducing amplitude of light; wherein the distortion-inducing amplitude of light relates to different wavelengths of light emitted by one or more of a plurality of light sources in a non-uniform manner so the effect of the distortion-inducing amplitude of light is difficult to predict, thereby providing obfuscation and encryption of the data stream.

20 Claims, 10 Drawing Sheets

(56) References Cited

U.S. PATENT DOCUMENTS

| | | | |
|---|---|---|---|
| 6,326,910 B1* | 12/2001 | Hayduk | G02F 7/00 341/137 |
| 6,804,412 B1 | 10/2004 | Wilkinson | |
| 6,990,281 B2 | 1/2006 | Shahar et al. | |
| 7,554,707 B1 | 6/2009 | Golshan | |
| 7,747,102 B2 | 6/2010 | New et al. | |
| 8,610,839 B2 | 12/2013 | New et al. | |
| 9,280,848 B1* | 3/2016 | Chen | G06T 15/506 |
| 2004/0150888 A1* | 8/2004 | Domjan | G02B 27/0172 359/630 |
| 2005/0211881 A1 | 9/2005 | Ponomarenko | |
| 2007/0268366 A1 | 11/2007 | Raskar | |
| 2008/0266626 A1 | 10/2008 | Zalevsky et al. | |
| 2009/0079987 A1 | 3/2009 | Ben-Ezra et al. | |
| 2014/0270758 A1* | 9/2014 | Nejadmalayeri | H04L 5/14 398/41 |

OTHER PUBLICATIONS

Bengi, Kemal, Optical Packet Access Protocols for WDM Networks, 2002, vol. 1 of Broadband Networks and Services, Springer Science & Business Media, New York.

Communication dated Nov. 2, 2016, issued by the United States Patent and Trademark Office in U.S. Appl. No. 14/294,212.

Communication dated Oct. 3, 2016 issued by the U.S. Patent and Trademark Office in U.S. Appl. No. 14/670,197.

Dolev, Shlomi and Oltean, Mihai, "Optical Supercomputing, 4th International Workshop, OSC 2012 in Memory of H. John Caulfield Bertino, Italy 2012, Revised Selected Papers", 2013, Springer-Verlag Berlin Heidelberg.

Dolev, Shlomi et al., "Optical Supercomputing, Third International Workshop, OSC 2010, Bertino, Italy, Nov. 2010, Revised Selected Papers", 2011, Springer Verlag Berlin Heidelberg.

Dolev, Sholomi et al., "Optical Supercomputing, Second International Workshop, OSC 2009, Bertinoro, Italy, Nov. 2009 Proceedings", 2009, Springer—Verlag Berlin Heidelberg.

Goswami, Debabrata, "Optical Computing", Resonance: Journal of Science Education, Jun. 2003, pp. 56-71, vol. 8, Issue 6, Springer, India.

Karim, Mohammad A. and Awwal, Abdul A.S., Optical Computing: An Introduction, 1992, John Wiley & Sons, Inc., New York, NY, USA.

Lee, John N., Design Issues in Optical Processing, 1995, Cambridge University Press, New York, NY, USA.

McAulay, Alastair D., Optical Computer Architectures: The Applications of Optical Concepts to Next Generation Computers, 1991, John Wiley & Sons, Inc., New York, NY, USA.

Naughton, Thomas J. and Woods, Damien, "On the Computational Power of a Continuous-Space Optical Model of Computation", In: MCU '01 Proceedings of the Third International Conference on Machines, Computations, and Universality, May 2001, pp. 288-299, Springer-Verlag London, UK.

Vanderlugt, Anthony, Optical Signal Processing, 2005, John Wiley & Sons, Inc., Hoboken, New Jersey.

Woods, Damien and Gibson, J. Paul, "Complexity of Continuous Space Machine Operations", New Computational Paradigms, Jun. 2005, pp. 540-551, Springer, Berlin, Heidelberg.

Woods, Damien and Gibson, J. Paul, "Lower Bounds on the Computational Power of an Optical Model of Computation", Unconventional Computation, Oct. 2005, pp. 237-250, Springer, Berlin, Heidelberg.

Woods, Damien and Naughton, Thomas J., "An Optical Model of Computation", Theoretical Computer Science, Apr. 2005, pp. 227-258, vol. 334, Issues 1-3, Elsevier Science Publishers Ltd. Essex, UK.

Woods, Damien and Naughton, Thomas J., "Optical Computing", Applied Mathematics and Computation, Oct. 2009, pp. 1417-1430, vol. 215, Issue 4, Elsevier Science Inc., New York, NY, USA.

Woods, Damien and Naughton, Thomas J., "Optical Computing: Photonic Neutral Networks", Nature Physics, Apr. 2012, pp. 257-259, vol. 8, Nature Publishing Group.

* cited by examiner

SYMMETRIC DATA ENCRYPTION SYSTEM AND METHOD

CROSS-REFERENCE TO RELATED APPLICATIONS

This is a continuation of U.S. patent application Ser. No. 14/995,888, filed Jan. 14, 2016 (allowed), which claims the benefit of U.S. provisional application No. 62/154,528, filed Apr. 29, 2015, and U.S. provisional application No. 62/173,085, filed Jun. 9, 2015, the contents of which are incorporated by reference, herein, in their entirety.

FIELD

This application relates to a symmetric data encryption system which performs symmetric encryption operations. Some embodiments involve light interference relations.

SUMMARY

These embodiments describe a symmetric data encryption system which utilizes light to perform data encryption. "Light" as used herein is not limited to visible light and is used to generally refer to any light in the electromagnetic spectrum. Distinct wavelengths of light representing in their respective amplitudes numerical operands or segments of a data stream interact with a predetermined distortion-inducing amplitude of light to produce cumulative light values subsequently sensed by corresponding light sensors. Voltages across the plurality of light sensors are determined by the total light of a particular wavelength incident upon each light sensor; the total light representing a segment combined with the distortion-inducing value. Values representing the total light incident upon each sensor are then transmitted as an encrypted signal. The predetermined distortion-inducing amplitude has a different distortion-inducing effect per wavelength of light with which it interacts. The way the distortion-inducing light varies is known to both the encoder and the decoder.

Following transmission of the encrypted signal, light values are reproduced at a transmission decoder and the distortion-inducing value is removed or compensated for, providing the original data. In an embodiment original data is alternatively determined from a look-up table using the transmitted encrypted signal. Because the distortion is different for different wavelengths of light and for different amplitudes of the distortion-inducing light, the distortion of the data encrypts the data stream in a robust and novel fashion.

These embodiments include symmetric data transmission and reception apparatuses usable with the data encryption system.

Further, these embodiments include a symmetric data transmission method related to the data encryption system.

DETAILED DESCRIPTION

A first example embodiment is a symmetric data encryption system configured to receive a data stream to be encoded; to relate light representing each segment of the data stream with a predetermined distortion-inducing light to encrypt the data stream; to transmit the data stream; and to decrypt the data stream by removing or compensating for the value induced by the distortion-inducing amplitude of light. In this example embodiment, the distortion-inducing light contributes to different wavelengths of light emitted by one or more of a plurality of light sources in a non-uniform (e.g., non-linear) manner so the effect of the distortion-inducing amplitude of light is difficult to predict or unpredictable, thereby providing obfuscation and encryption of the data stream.

Figure 1:
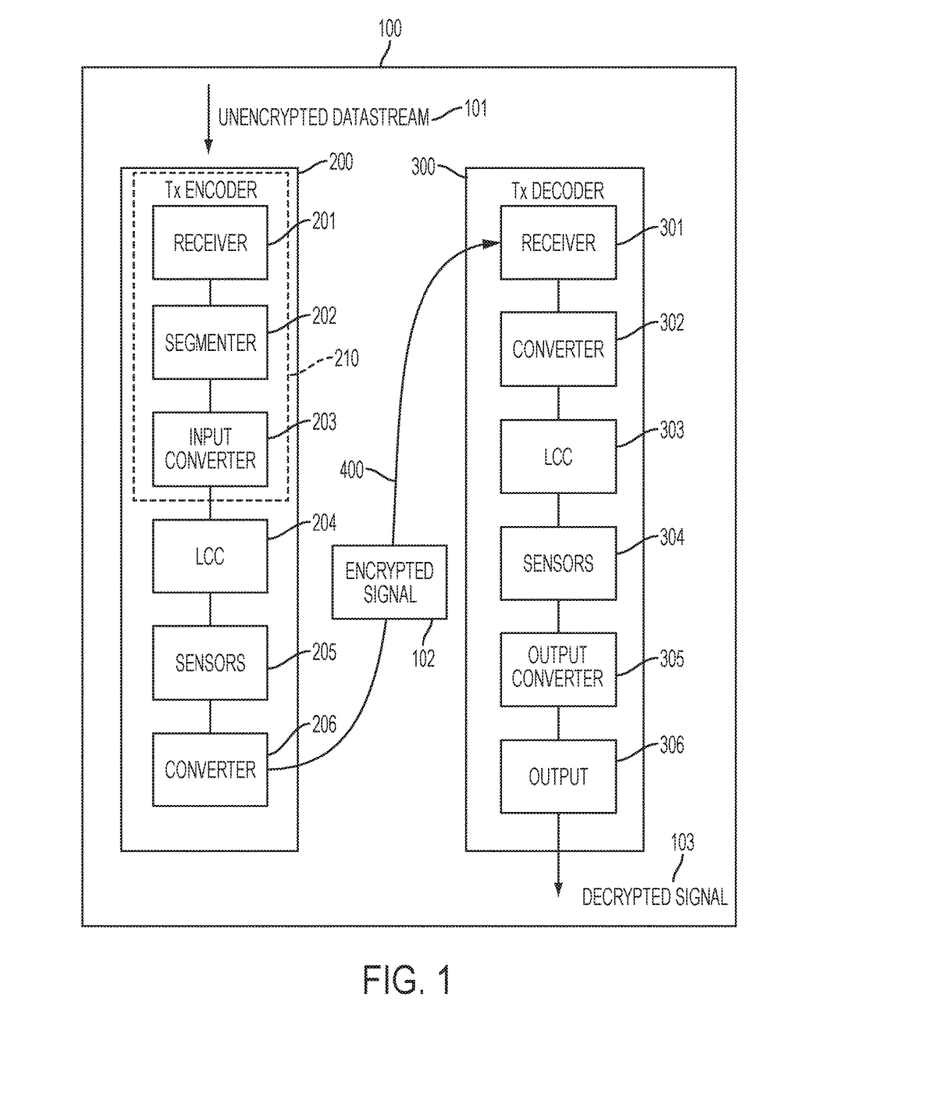
FIG. 1 shows a symmetric data encryption apparatus according to an embodiment.

FIG. 1 shows an overview of the encryption system 100 including transmission encoder 200, transmission decoder 300, and transmission path 400.

Transmission encoder 200 includes receiver 201, segmenter 202, input converter 203, first light containment cavity 204, first plurality of light sensors 205 and output converter 206.

Transmission decoder 300 includes receiver 301, input converter 302, second light containment cavity 303, second plurality of light sensors 304, output converter 305 and output circuit 306.

Receiver 201, segmenter 202, input converter 203, output converter 206, receiver 301, input converter 302, output converter 305, and output circuit 306 are, in an embodiment, implemented via a digital computer or the like comprising a hardware processor and a memory and is implemented via a hardware processor. A hardware processor refers to, without limitation, a general-purpose processor core, an application-specific integrated circuit, a programmable logic array, or a non-digital analog controller.

Transmission encoder 200 is configured to receive unencrypted data stream 101 and produce encrypted signal 102. Receiver 201 is configured to receive a data stream (e.g. a stream of data packets) to be encoded. Segmenter 202 is configured to segment the received data stream (e.g. each data packet) into a plurality of discrete portions according to a predetermined transmission resolution of the system. Segmenter 202 segments the received data stream by extracting at least one packet payload from at least one packet; dropping the header and footer of the at least one packet, if present; segmenting the payload into one or more discrete portions of the plurality of discrete portions according to a predetermined segmenting size; and providing the one more discrete portions of the plurality of discrete portions to input converter 203. Input converter 203 is configured to convert, one by one, each given discrete portion of the plurality of discrete portions into a first light source control signal so that light is emitted by one or more of a plurality of light sources at amplitudes representing a value of the given discrete portion. First light containment cavity 204 is configured to relate the first amplitude of light emitted by one or more of the plurality of light sources with a distortion-inducing amplitude of light which in one embodiment is a predetermined amplitude of light, or in another embodiment, is a variable distortion-inducing amplitude of light to produce a related amplitude of light, the light containment cavity being further configured to contain the related light. One or more light sensors of first plurality of light sensors 205 is configured to sense the related amplitude of light, thereby generating a first light amplitude representation signal. Finally, output converter 206 is configured to convert the first light amplitude representation signal to an encrypted signal this conversion includes attaching a header and footer to form an Internet Protocol (IP) packet for transmission over a conventional IP network.

In an exemplary embodiment, receiver 201, segmenter 202, and input converter 203 are implemented by an integrated circuit (IC) 210. Integrated circuit 210 comprises one of a field programmable gate array (FPGA), a one-time programmable array logic array (OTPLA), and an application-specific integrated circuit. By performing reception, segmentation, and conversion of unencrypted data stream 101 in a single device (integrated circuit 210), the cost, power requirements, and complexity of transmission encoder 200 can be reduced significantly.

Transmission path 400 is configured to transmit encrypted signal 102 to transmission decoder 300.

Transmission decoder 300 is configured to receive encrypted signal 102 and produced decrypted signal 103. Receiver 301 is configured to receive the encrypted signal from transmission path 400. Input converter 302 is configured to convert the encrypted signal into a second light source control signal. Then a controller (not shown) is configured to vary a second amplitude of light emitted by one or more of a plurality of light sources (ex: 520) until the cumulative amplitude (also called a combined light amplitude) of the second amplitude of light and the predetermined amplitude of light or distortion-inducing amplitude of light emitted by a distortion-inducing light source (ex: 540) matches the second light source control signal. The controller controls the emission light source to reach a matched light amplitude so the combined light amplitude matches the light source control signal amplitude. In an embodiment, emission light sources 520 are be light emitting diodes (LEDs) or coherent light sources. Second light containment cavity 303 is configured to contain the second amplitude of light. One or more of second plurality of light sensors 304 configured to sense the second amplitude of light corresponding to the encrypted signal, wherein following sensing of cumulative amplitude of the second amplitude of light and the predetermined amplitude of light or distortion-inducing amplitude of light matching the second light source control signal, the value input to the one or more of a plurality of light sources is determined as a second light amplitude representation signal. Output converter 305 is configured to convert the second light amplitude representation signal corresponding to the first light source control signal into digital format data, namely, a discrete portion of the data stream matching the original discrete portion prior to encryption. This data is a digital signal in embodiments.

Output converter 305 is configured much in the same fashion as input converter 203 but performs the function(s) thereof in reverse order. Output circuit 306 is configured to output digital format data as decrypted data, namely, the discrete portion of the data stream as decrypted signal 103. In the case that the data stream is constituted of a plurality of IP packets, output circuit 306 is configured to recombine one or more discrete portions constituting a complete packet payload, and to reinsert a header and or footer (as appropriate) before outputting decrypted signal 103.

Figure 3A:
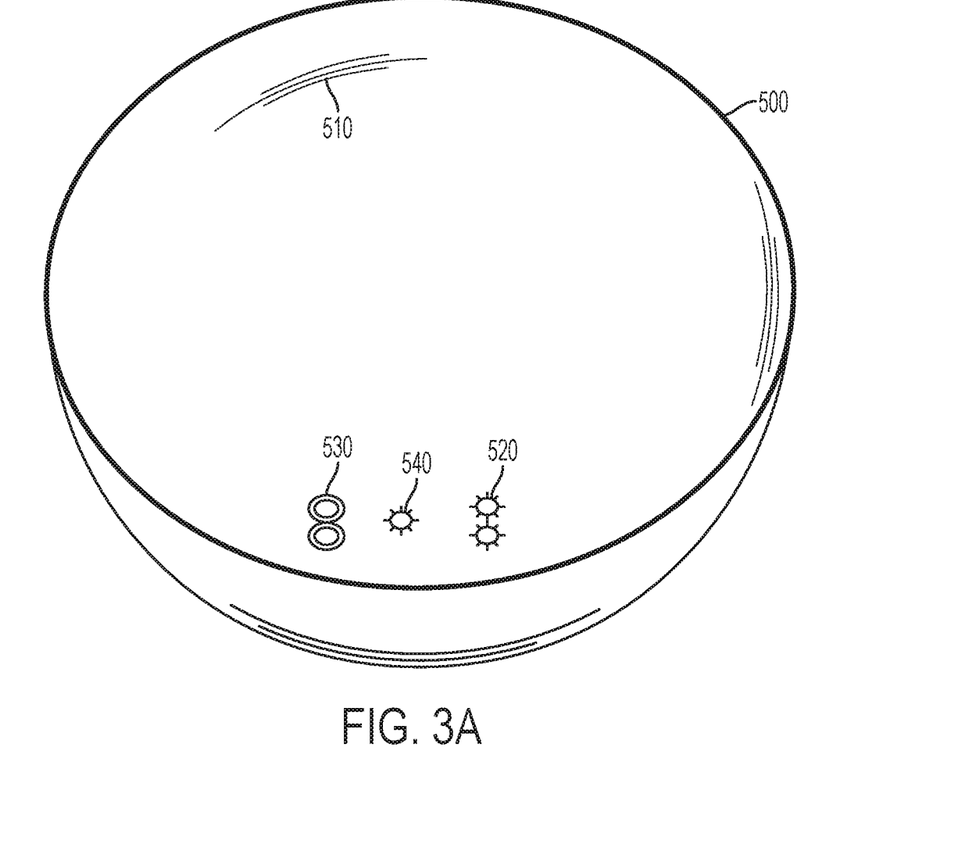
FIG. 3A shows an oblique view of an embodiment of a light containment cavity.

FIG. 3A depicts an oblique view of an embodiment of a light containment cavity 500. Both first light containment cavity 204 and second light containment cavity 303 are of a configuration matching light containment cavity 500. Further, first plurality of light sensors 205 and second plurality of light sensors 304 respectively match the configuration of light sensors 530. Light containment cavity 500 also features light containment cavity 500 interior 510, which is used in relating wavelengths of light with a predetermined distortion-inducing amplitude of light, the predetermined distortion-inducing amplitude of light being produced by distortion-inducing light source 540 in respective instances of light containment cavity 500 first light containment cavity 204 and second light containment cavity 303. Other configurations and layouts of light sources 520, light sensors 530, and distortion-inducing light source 540 can be implemented as required by the constraints of other embodiments. Such arrangements include more or fewer light sources and sensors, and different geometric arrangements thereof.

In alternative embodiments, the light containment cavity 500 is formed from a sphere, from a polyhedron, from a cavity etched or formed within a solid, from a shape approximating a hemisphere; or from any other suitable hollow interior.

In further alternative embodiments, the light containment cavity 500 is provided with a free-space interior, i.e., an interior free of intervening electrical components. An advantage of using a free-space interior is that the necessity for precise alignment of any mirrors, grids, gratings, lenses, or the like is avoided.

In yet further alternative embodiments, the various light sources 520 and 540 are implemented with coherent light or with light produced by LEDs. In an alternative embodiment, the LEDs are uniform but generate different wavelengths of light through use of overlaid filter elements. The filter elements, in an embodiment, are implemented using quantum dots.

Figure 3B:
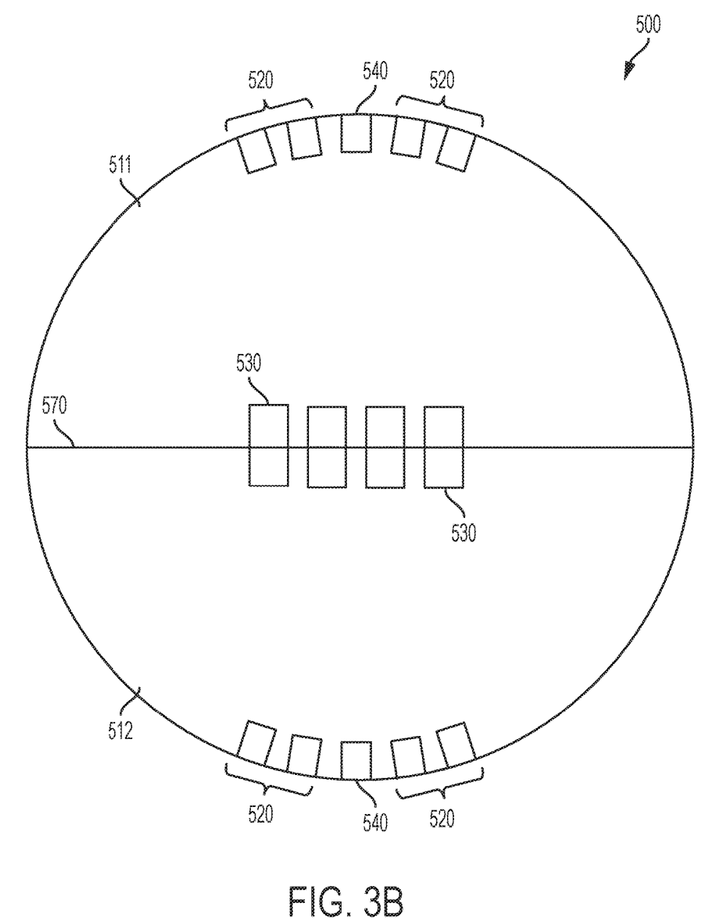
FIG. 3B shows a cross-section of an embodiment of a light containment cavity.

FIG. 3B depicts a cross-section of another embodiment of light containment cavity 500. In this embodiment, transmission hemisphere 511 and reception hemisphere 512 each serve as first light containment cavity 204 and second light containment cavity 303, respectively. In this way, the two light containment cavities can be formed in a single manufacturing process, and the overall size of the system can be reduced. Such a configuration might be useful in a single apparatus which can support both transmission and reception of data. Both transmission hemisphere 511 and reception hemisphere 512 feature light sources 520, biasing light sources 540, and light sensors 530. By way of a dividing plane 570, light interactions in each respective hemisphere does not interfere with the interactions of the other hemisphere.

In another embodiment, the hemispheres 511 and 512 of light containment cavity 500 are used in a redundant system, so both hemisphere 511 and hemisphere 512 are used in a transmission role. Another instance of light containment cavity 500 is present (two light containment cavities 500 are used), both hemispheres thereof being used in a reception role. In this manner, various forms of error checking may be implemented due to the redundancy of operations. This configuration allows for greater resiliency of transmitted data. In a further embodiment, a single light containment cavity 500 in FIG. 3B features mode switching functionality which allows hemispheres 511 and 512 to individually or cooperatively alternate between transmission and reception roles. Such a configuration facilitates error checking between reception cycles.

Figure 4A:
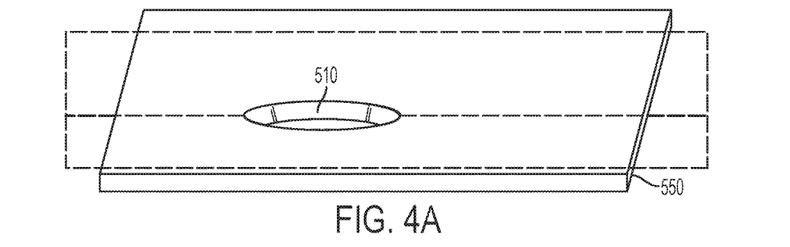
FIG. 4A shows an embodiment of single layer of a substrate used to form a light collection cavity.
Figure 4B:
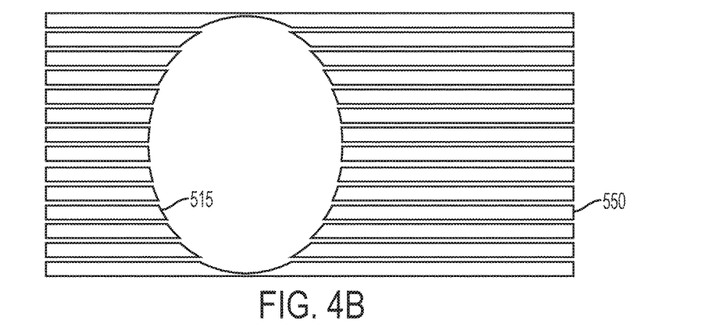
FIG. 4B shows the substrate from FIG. 4A in a cross-sectional view in proximity with other substrates.
Figure 4C:
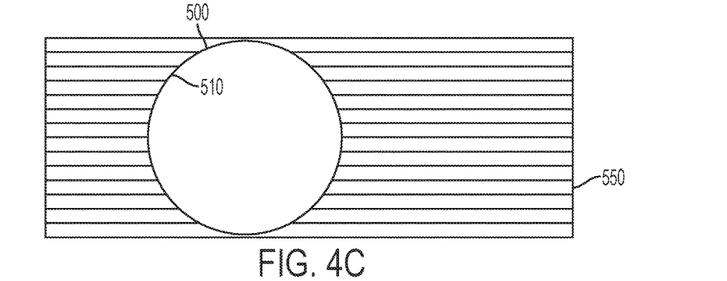
FIG. 4C shows an assembly of substrates in cross-section.

FIGS. 4A-4C depict an example embodiment of a light containment cavity 500 constructed using a plurality of substrates 550. In FIG. 4A, a single substrate 550 is shown, in which a slice of light containment cavity interior 510 has been etched or cut. In an embodiment, forming and shaping of substrate 550 is accomplished by any conventional means. In FIG. 4B, a plurality of substrates is shown in proximity to one another prior to being bonded or otherwise integrally connected. In FIG. 4C, a completed light containment cavity 500 with light containment cavity interior 510 is shown, light containment cavity 500 being formed out of a plurality of bonded substrates 550. FIGS. 4A-4C exemplify that in an embodiment, light containment cavity 500 is created from the combination of a plurality of adjacent substrates 550 to facilitate production according to the needs of the embodiment, the thickness of the available materials, the size, and the shape of light containment cavity 500. By this method of construction, the interior space of the light containment cavity 500 is free of interposed components.

Figure 4D:
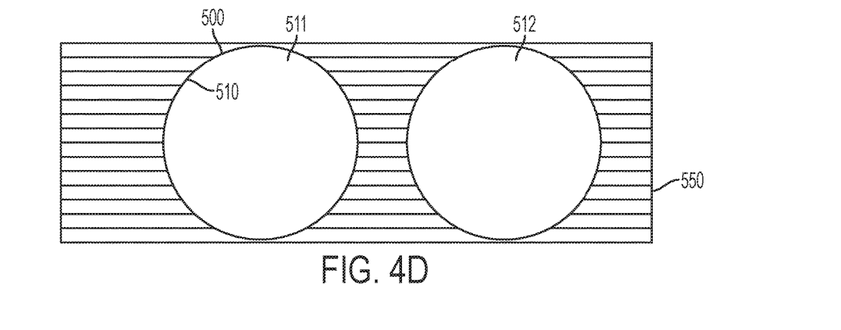
FIG. 4D shows another embodiment of substrates in cross-section.

FIG. 4D depicts another example embodiment in which two instances of light containment cavity 500 are formed in the same plurality of substrates 550. Formation of these two instances of light containment cavity 500 follows the same process as disclosed regarding FIGS. 4A-4C. Such a configuration might be useful in a single apparatus which can support both transmission and reception of data.

Figure 5:
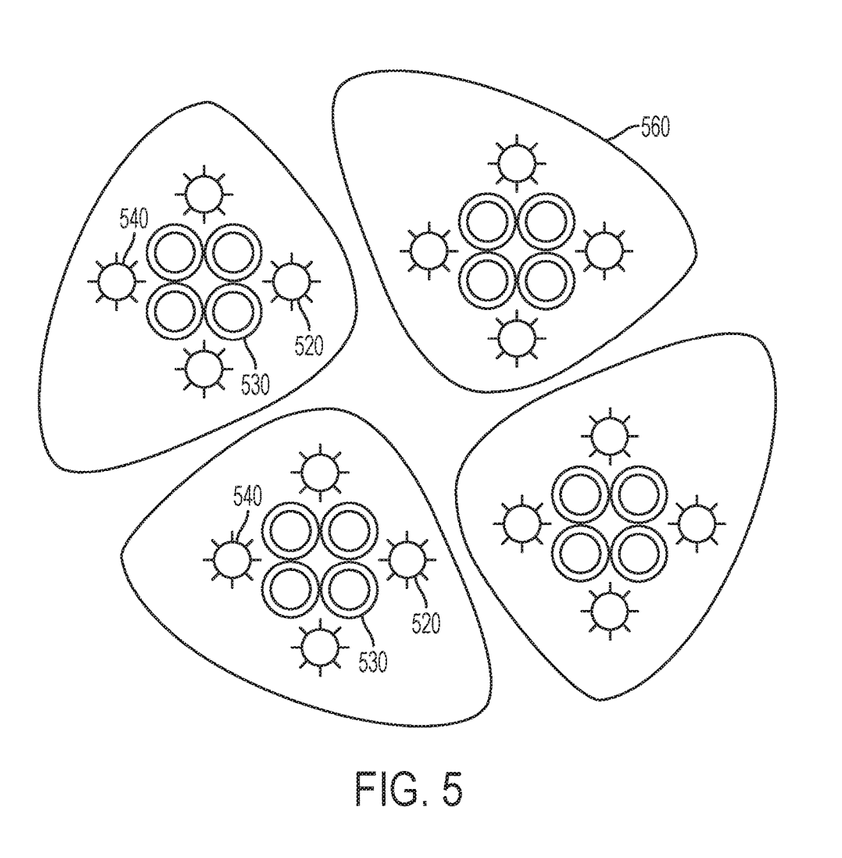
FIG. 5 shows an arrangement of light filters with light sources and light sensors.

FIG. 5 depicts distortion-inducing light sources 540, light sensors 530, light sources 520, and filters 560. In an embodiment according to FIG. 5, a filter 560 is used to filter input and output (respectively) with respect to one or more light sources 520 and one or more light sensors 530. By sharing a filter 560 among multiple sources and sensors, the cost of manufacturing can be decreased.

Filter 560 is manufactured by conventional means (such as doped glass or the like). Further, filter 560 includes a cuvette filled with quantum dots. Upon interacting with light, the quantum dots induce a Stokes shift, changing the wavelength of the light. In this way, light sources 520 produce light at a particular wavelength which is then shifted to produce other wavelengths, providing multiple wavelengths with which to represent numeric values.

Figure 6:
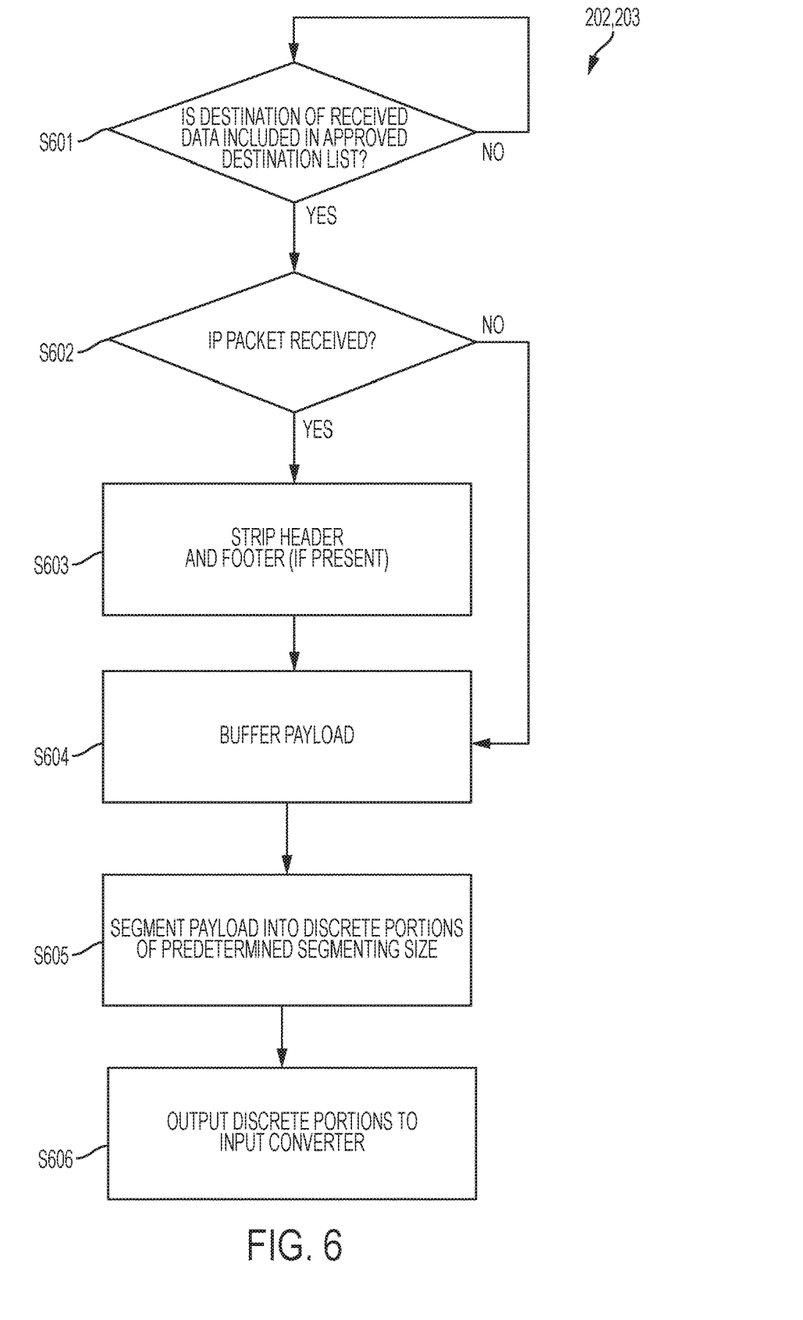
FIG. 6 is a flowchart showing an example operation of segmenter 202

FIG. 6 depicts a flowchart explaining operation of an embodiment of receiver 201 and segmenter 202. In step S601, data is received by receiver 201, and a determination is made, based on a destination address of the data, on whether the received data is bound for an approved destination included in an approved destination list. If the received data is bound for an approved destination, it is passed to segmenter 202. If the data is not bound for an approved destination, it is passed to conventional IP routing hardware or the like (not shown) and is not processed by symmetric data encryption system 100. In step S602, segmenter 202 determines if the received data is an IP packet. If the data is not an IP packet, it is immediately segmented into discrete portions of a predetermined segmenting size (step S604). If the data is an IP packet, the header and footer (if present), with any other metadata, is stripped from the packet payload (step S603). The packet payload is segmented into discrete portions of a predetermined segmenting size (step S604). Regardless of whether the data is an IP packet, the segmented discrete portions produced in step S604 are outputted to input converter 203.

Figure 7:
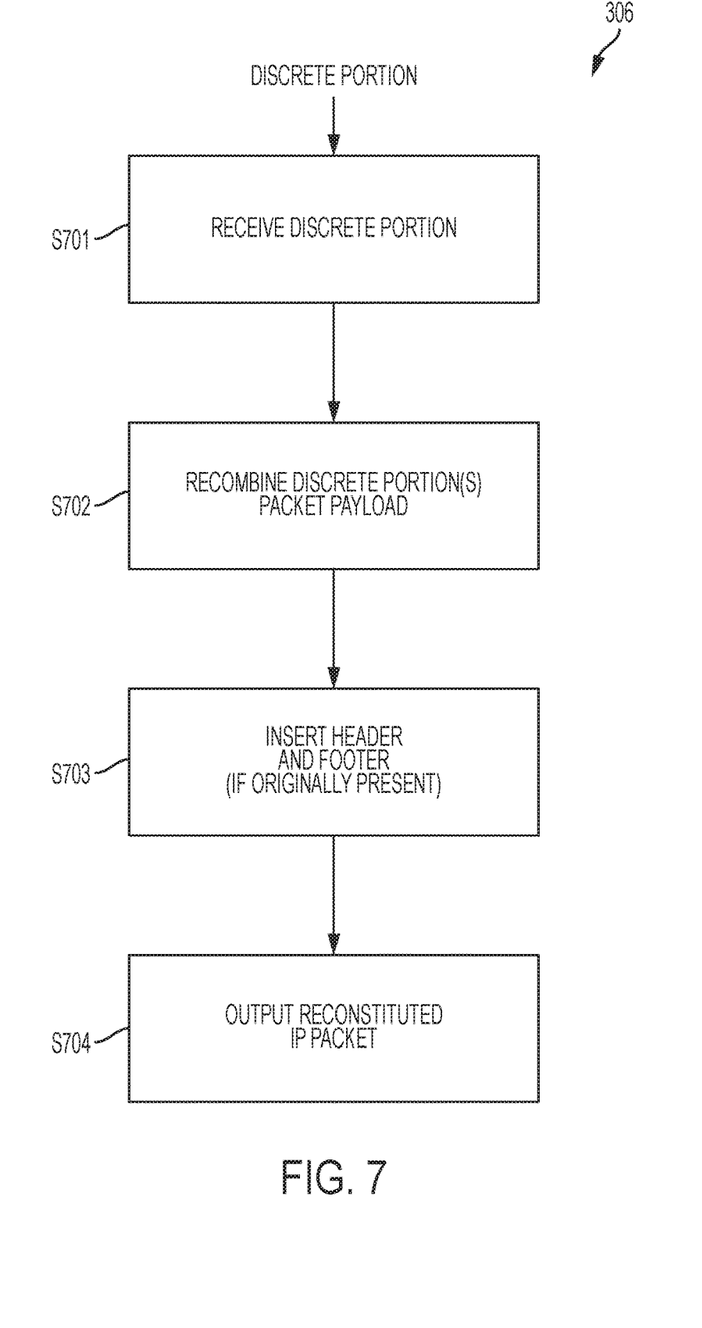
FIG. 7 is a flowchart showing an example operation of output circuit 306.

FIG. 7 depicts a flowchart explaining operation of an embodiment of output circuit 306 in which unencrypted data stream 101 as received by transmission encoder 200 comprises IP packets. In step S701, a discrete portion of the data stream is received from converter 305. The discrete portion is recombined with any other discrete portions of the same IP packet, the other discrete portions also being received and processed by output circuit 306 (step S702). Following recombination of the packet payload, a header and footer (if originally present) are reinserted to reconstitute a whole IP packet (step S703). Finally, in step S704, the reconstituted IP packet is outputted as decrypted signal 103.

Figure 8:
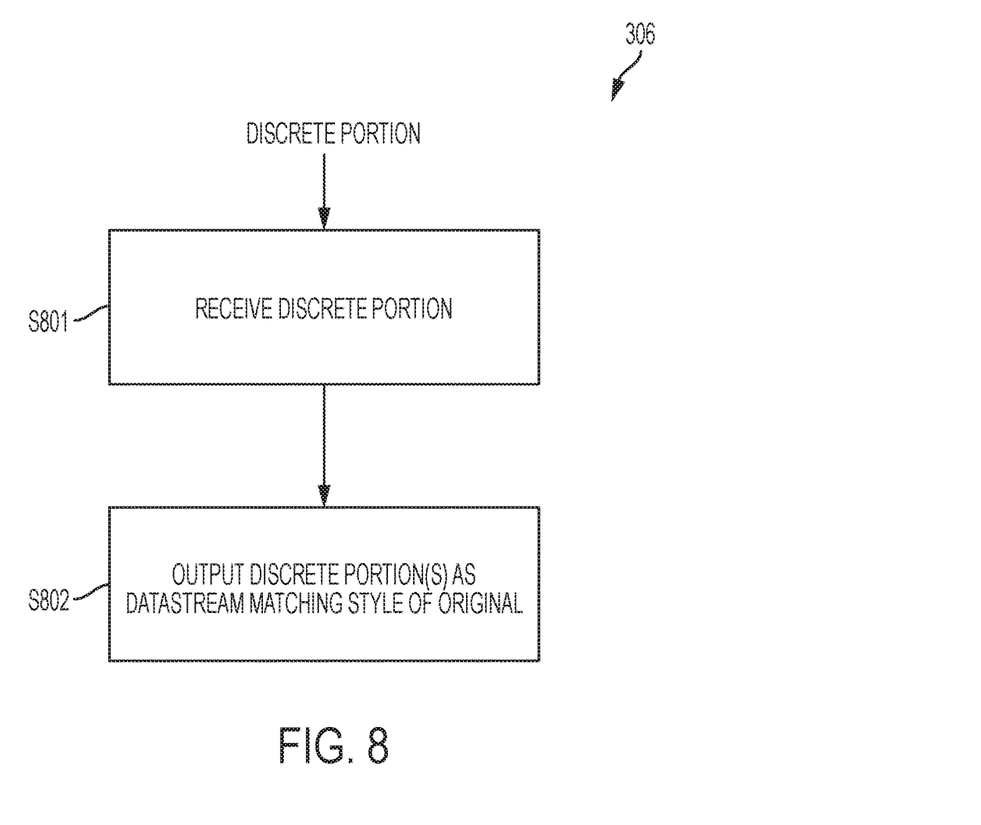
FIG. 8 is a flowchart showing an example operation of an alternative embodiment of output circuit 306.

FIG. 8 depicts a flowchart explaining operation of an embodiment of output circuit 306 in which unencrypted data stream 101 as received by transmission encoder 200 comprises a raw data stream not demarcated into IP packets or a similar concept. In step S801, the discrete portion of the data stream is received from converter 305. In step S802, the discrete portion (with any other discrete portions) is outputted as a data stream with characteristics matching those of unencrypted data stream 101. In this way, transmission of the data stream appears seamless to a user.

Figure 2:
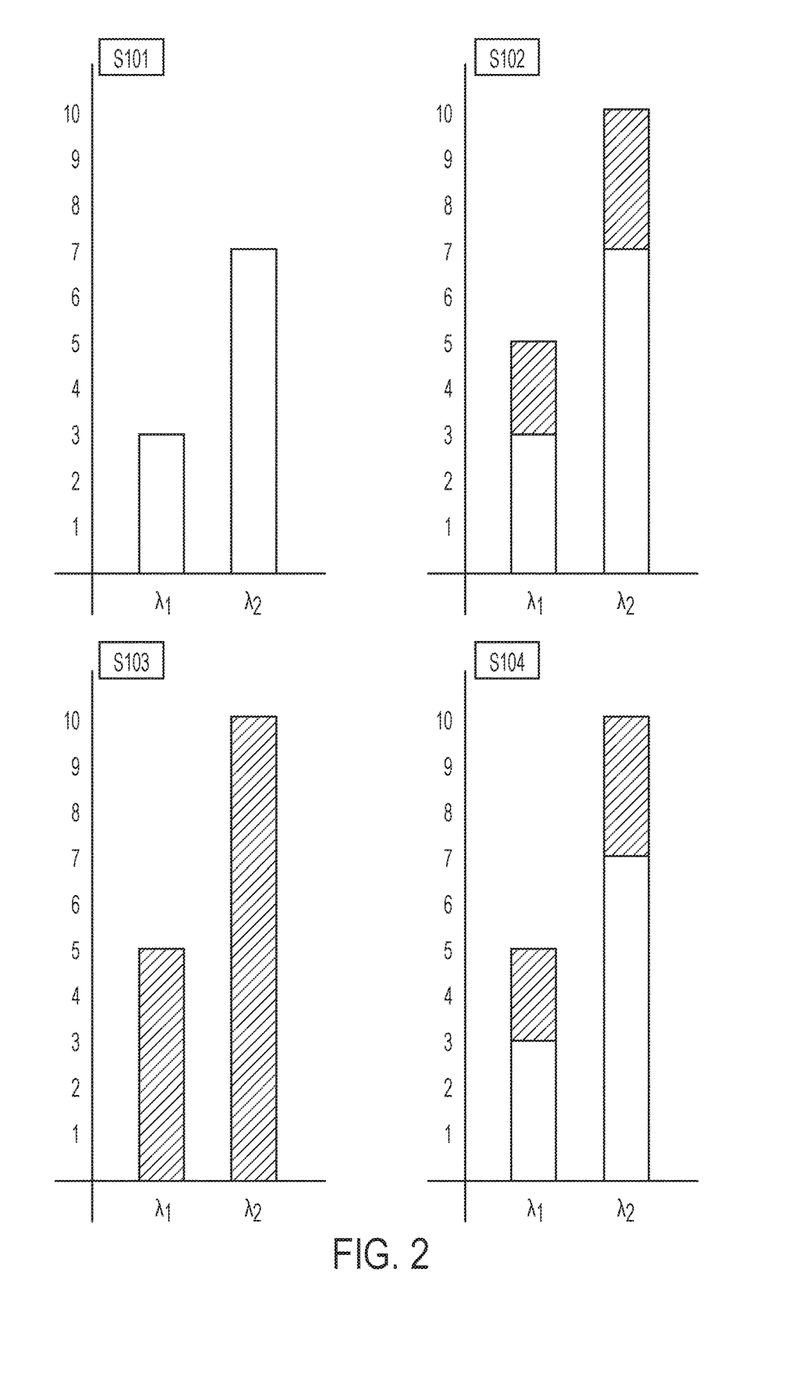
FIG. 2 shows an example operation of an embodiment of the symmetric data encryption apparatus.

Herein a sample operation of the above disclosed system is explained referring to FIG. 2. In FIG. 2, graphs depicting the numeric value represented by two wavelengths of light, $\lambda_1$ and $\lambda_2$, are depicted at various stages of the process executed by symmetric data encryption system 100. It will be appreciated that this description is simplified for explanation and expediency.

In step S101, input converter 203 receives from segmenter 202 a packet payload as a binary string of, for example 111011. The binary string can be of arbitrary length; the string has been chosen for expediency of explanation. From this payload, segmenter 202 extracts two 3-bit strings by de-concatenation of the binary string to arrive at two values, 111 and 011, each respectively corresponding to $\lambda_2$ and $\lambda_1$. If the binary string is of a different length, input converter 203 would repeatedly follow this process so the necessary number of 3-bit string pairs successively corresponding to $\lambda_2$ and $\lambda_1$ are de-concatenated therefrom. Following arrival at two values 111 and 011, input converter 203 pads each of the three-bit values at their most significant bit to create two four-bit values, 0111 and 0011. These values are then converted to base 16 (i.e. hexadecimal), rendering 7 and 3. This conversion from binary to hexadecimal is carried out by any conventional means, such as via a central processing unit (CPU) or hardware processor of the input converter 203. As one (each) of sixteen possible hexadecimal values, $\lambda_1$ and $\lambda_2$ are in an appropriate form to be converted to input values to respective light sources, the pair of $\lambda_1$ and $\lambda_2$ corresponding to a first light source control signal. Each possible hexadecimal value is related to one of fifteen possible analog electrical input values to each respective light source. For example, a hexadecimal value of zero might correspond to an input voltage of zero volts, whereas a hexadecimal value of eight might correspond to an input value of 0.08 volts (with 0.1-volt steps per hexadecimal value between). In other embodiments, other relations between hexadecimal values and analog electrical values are defined as required by the specific embodiment. In a further embodiment, this relation is stored in a look-up table or the like. In yet another embodiment, a variable voltage source is used with the CPU or hardware processor of the input converter 203 to produce the appropriate analog electrical values. Following conversion to analog values, $\lambda_1$ and $\lambda_2$ are in the proper form to be passed to corresponding light sources.

These two analog component representations of a discrete portion of data to be encrypted (constituting the first light source control signal) are emitted as $\lambda_1$ and $\lambda_2$ in first light containment cavity 204 by a pair of light sources, each of which can produce eight discrete values (for brevity, representations of hardware configurations are not shown in FIG. 2) and are sensed by one or more of a first plurality of light sensors 205, each of which can sense sixteen discrete values (corresponding to the maximum number of digits in the base sixteen positional numeral system). The graphs in FIG. 2 have a maximum value of ten on the y-axis; this does not indicate a maximum value of the light sensor(s) but is rather chosen as the highest value in this example embodiment is ten. The sensors are, as mentioned capable of detecting values up to $F_{16}$ (i.e. $1111_2$ and $16_{10}$).

In step S102, $\lambda_1$ and $\lambda_2$ are related with a predetermined distortion-inducing amplitude of light to create $\lambda'_1$ and $\lambda'_2$; by additive relation, $\lambda_1$ and $\lambda_2$ respectively become 5 and 10. This predetermined distortion-inducing amplitude of light adds an amplitude of light corresponding to a numeric value between 0 and 8 to each respective wavelength $\lambda_1$ and $\lambda_2$. Thereby, the maximum additive value of any wavelength cannot exceed $111_2+1000_2$, or 1111 (i.e. F in base 16). Thus, there is no risk of a value of $\lambda_1$ or $\lambda_2$ exceeding the maximum value of $1111_2$ (i.e. $F_{16}$) that can be sensed by the sensor. In other embodiments, other luminal relations such as subtractive relation are utilized in place of or in addition to additive relation. The predetermined distortion-inducing amplitude of light has different effects on different wavelengths of light; for example, the additive relation related thereto causes a numeric gain of two represented in $\lambda_1$, but causes a numeric gain of three represented in $\lambda_2$.

In an embodiment, this variance does not scale in a uniform manner from one wavelength to the next. For example, the variance (per wavelength) is defined by the physical properties of the specific LED used to produce the predetermined distortion-inducing amplitude or the electrical characteristics of the light sensor. In another embodiment, the variance scales in a uniform manner from one wavelength to the next. In yet another embodiment, the variance is defined by the construction and geometry of first light containment cavity 204.

Following step S102, one or more encrypted signals representing $\lambda'_1$ and $\lambda'_2$ are transmitted to transmission decoder 300 via transmission path 400.

In step S103, amplitudes of light are varied until values corresponding to the transmitted values of $\lambda'_1$ and $\lambda'_2$ are sensed by one or more of second plurality of light sensors 304 within second light containment cavity 303 while a predetermined distortion-inducing amplitude of light equal to that emitted in first light containment cavity 204 is emitted therein.

In step S104, amplitudes (and therefore, corresponding numerical values) of input values of $\lambda_1$ and $\lambda_2$ are determined as corresponding to the original values of $\lambda_1$ and $\lambda_2$. The original values of $\lambda_1$ and $\lambda_2$ can be properly determined as respective light sources emitting $\lambda_1$ and $\lambda_2$ would have had to emit the original values (i.e. 3 and 7) in the presence of the predetermined distortion-inducing amplitude of light so the cumulative values 5 and 10) emitted in second light containment cavity 303 could be initially sensed by second plurality of light sensors 304 (i.e. to account for the presence of the predetermined distortion-inducing amplitude of light, the original values must compensate for any discrepancy in light amplitude not provide for by the predetermined distortion-inducing amplitude of light). The reduction in respective amplitudes in $\lambda_1$ and $\lambda_2$ is not necessarily uniform as the added amplitude from the predetermined distortion-inducing amplitude of light was not uniform.

Thereby, decrypted signal unencrypted data stream 101 can be securely transmitted as encrypted signal 102 and decrypted to decrypted signal 103.

In another embodiment, symmetric data encryption system 100 utilizes a 3-dimensional (3D) color space to represent the amplitudes of $\lambda_1$ and $\lambda_2$. In this embodiment, a 3D color space representation is transmitted from transmission encoder 200 to transmission decoder 300 via transmission path 400 and represents encrypted signal 102. Further, in this embodiment, the segments of the payload of unencrypted data stream 101 are respectively represented in a 3D color space. In this embodiment, the 3D color space representation comprises a tuple representing the various color components thereof. The 3D color space representation is not limited to this configuration.

To review the foregoing example embodiment at a high level, part or all of a payload of a data packet (i.e., a discrete portion) was converted from binary to hexadecimal so the numeric value of the discrete portion could be represented by fewer digits. In the example, a six-digit value in binary was represented by a two-digit value in hexadecimal. In other example embodiments, hexadecimal (i.e., "base 16") is replaced with a much higher numbering system defined based on the resolution of the sources and sensors.

As an example, assume that sources 520 and 540 can emit light up to 5 watts in power, and that the control circuitry can control each source in increments of one milliwatt. Likewise, assume that sensors 530 can each discriminate between different levels of light with a resolution of one milliwatt in a range up to at least 5 watts. With such components, the sources and sensors can discriminate five thousand different power levels.

Where each sensor can discriminate between five thousand different power levels, the numbering system in an embodiment is base 5000. In a numbering system of base 5000, the least significant digit can take on values from zero through 4999. The other, more significant digit can also take on values from zero through 4999, but it represents a value multiplied by the base raised to the first power (i.e., multiplied by $5000^1$). The maximum value in decimal that can be represented in two digits (given the components described above) is therefore $(4999 \times 5000^0)+(4999 \times 5000^1)=25000000$ or about 27 bits worth of data. Where base 5000 is used, therefore, the payload of a packet could be processed up to 27 bits at a time (i.e., discrete portions of 27 bits) with the amplitudes of $\lambda_1$ and $\lambda_2$ representing individual digits of the base 5000 value of the 27 bits of data.

Where the light sources and sensors can be controlled at a nanowatt resolution, the base in the immediately preceding example is 5,000,000. Two digits in base 5,000,000 can represent 44 bits of data, i.e., $(4999999 \times 5000000^0)+(4999999 \times 5000000^1)=2.5 \times 10^{13}$.

There is no reason to limit the number of wavelengths of light emitted by the sources and sensed by the sensors to two. In other example embodiments, more wavelengths of light are used so more digits are available, leading to the ability to represent larger numbers at the given resolution. For example, if light in four wavelengths is used, four digits can be represented. Where the resolution (i.e., the base) is 5,000,000, for example, the largest decimal number that can be represented with four digits is $(4999999 \times 5000000^0)+ (4999999 \times 5000000^1)+(4999999 \times 5000000^2)+(4999999 \times 5000000^3) \approx 7.8 \times 10^{46}$ which works out to approximately 155 bits of binary data.

Assume for the moment that four wavelengths of light are used, one per each "light" digit, and that the resolution of the components permits the use of base 5,000,000. About 155 bits of binary data could be represented in the four light digits. Adding distortion-inducing light, however, increases the amount of data to be represented. Therefore, instead of taking 155 bits each time, the number of bits is reduced in some example embodiments so the addition of distortion-inducing light does not cause overflow.

In yet another embodiment, the light sources producing $\lambda_1$ and $\lambda_2$ each have an input voltage range of spanning a predetermined voltage range. In this embodiment, a range of 2.5-7.5 V is utilized, but other ranges (i.e. 0-5 V, etc. may be utilized as is appropriate to a given embodiment). Further, these sources can be modulated at a step size of 50 µV allowing for a maximum of 1,000,000 possible steps. Additionally, using a sufficiently sensitive digital to analog converter, a 16-bit binary input value can be converted to an analog signal between 2.5 and 7.5 V at a 50 µV step size. As an example, a lowest activation voltage of 50 µV relates to binary value of $0000000000000001_2$, and a next lowest activation voltage of 100 µV relates to a binary value of $0000000000000010_2$. In this way, binary values can be easily represented converted to analog voltages. Further, by proper enforcement of a logical upper bound, there is no risk of a value of $\lambda_1$ or $\lambda_2$ exceeding a maximum value of $0000000011111111_2$ (overflow protection is further provided by the bit length of the value).

The distortion-inducing light is introduced at the encoding end. Since the sensors typically have a non-linear response to adding the distortion-inducing light, the values sensed are forced to be unpredictably different from the actual values that were represented by the light digits. The sensed values, at the encoding end, therefore do not accurately represent the original light digits but have been distorted to other values by the distortion-inducing light.

In an embodiment, the distortion-inducing light is varied with each encoding operation, or every so often, in accordance with a scheme selected by the designer. The variation scheme must be known at the encoding end and at the decoding end so the effect of the distortion-inducing light introduced when encoding takes place can be appropriately compensated when decoding takes place.

After the sensors sense the distorted values, the result is converted into binary and the resulting binary is sent in place of the part of the payload that was encoded. Thus, the data sent after encoding is distorted in a manner that is non-linear and unpredictable. The data sent after encoding is a representation of the distorted values of each of the light digits.

At the time of decoding, the appropriate portion of the packet payload is converted from binary into the same number of light digits as before. Light corresponding to the distorted values is generated from the light sources, and the effect of the distortion-inducing light is compensated for so the original values of the light digits can be retrieved. From the original light digits, the actual payload is restored by simple conversion to binary.

To compensate for the effect of the distortion-inducing light, several approaches are available.

In one approach, a look-up table is used at the time of decoding. A table is generated by empirical observation beforehand, so the effect of the distortion-inducing light is known for all used amplitudes of the distortion-inducing light.

In operation at the transmission decoder, once the amplitude of the distortion-inducing light is known, an output converter extracts the distorted value from a received encrypted signal, and a look-up table comparison processor compares the distorted value to the look-up table to obtain the undistorted payload.

In such an embodiment (FIG. 9), look-up table comparison processor 307 utilizes a look-up table stored in a non-volatile memory (not shown), comparing a light source control signal output from input converter 302 with known values to convert the light source control signal into a light amplitude representation signal.

In another approach, the light collection chamber at the decode side is provided with the distortion-inducing light in the amount used at the time of encoding. The light sources 520 are raised in amplitude until the sensors 530 detect that the sensed light matches that which is indicated in the encrypted data. Then, the distortion-inducing light is zeroed while the light sources 520 are held at their just-reached amplitudes. The sensed light at that time will match the pre-encryption data values.

Figure 9:
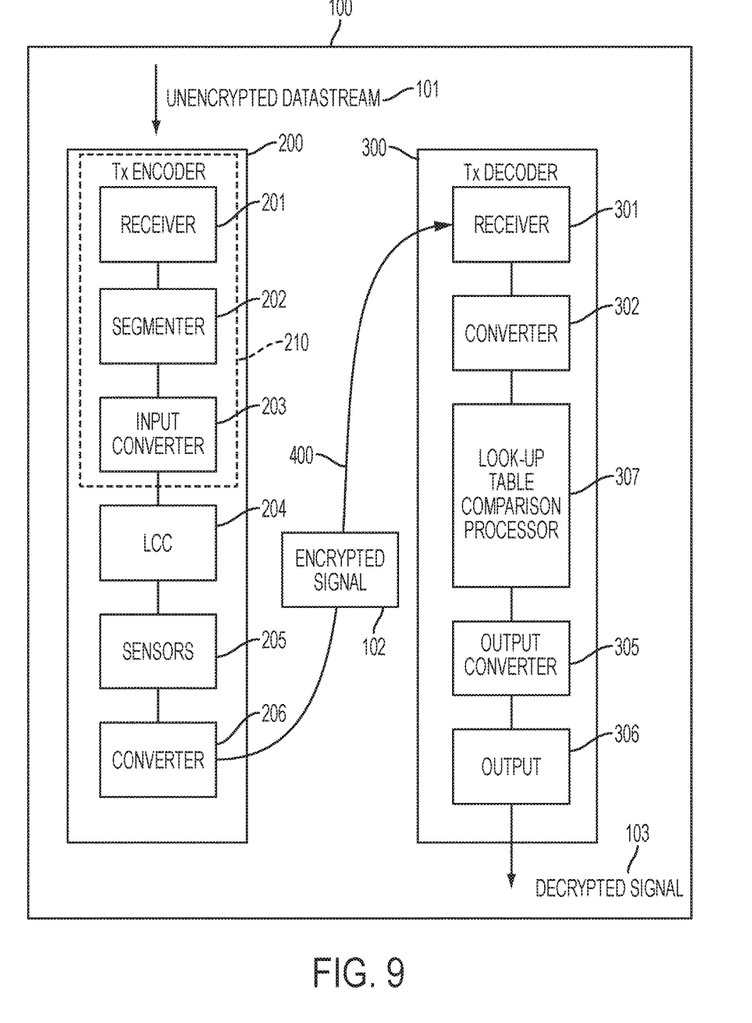
FIG. 9 shows an alternative embodiment of a symmetric data encryption apparatus.

In an alternative embodiment, look-up table comparison processor 307 is configured to calculate a second light amplitude representation signal by algorithmically processing the second light source control signal to predict an input value of at least one second light source conjunction with a second distortion-inducing light source calculated to have light emission properties identical to those of the first distortion-inducing light source. In this way, rather than re-creating light and distortion-inducing light as was produced in transmission encoder 200, transmission decoder 300 instead mathematically predicts the value of a light amplitude representation signal. Such an approach is beneficial in reducing cost and complexity of the system.

Certain embodiments of the symmetric encryption system 100 are implemented so the form factor of the transmission encoder 200 and transmission decoder 300 respectively are mounted within a standard rack mount server case; each component can be installed in a standard server rack to facilitate ease of integration with conventional computing components.

Further embodiments of the symmetric data encryption system 100 are implemented so the transmission encoder 200 and the transmission decoder 300 are mobile devices which can be transported by a user with relative ease. Accordingly, the symmetric data encryption system 100 can easily be moved from one location to another as a need to do so arises.

Yet further embodiments of the symmetric data encryption system 100 are implemented so the form factor of the transmission encoder 200 and transmission decoder 300 respectively fit within a case which approximately matches the size of a personal computer (PC) case, such as a PC case as found to contain a motherboard conforming to the "Advanced Technology Extended" (ATX) or mini-ATX standard. In this way, the symmetric data encryption system 100 could easily be integrated into a standard office environment with no specialized mounting or installation hardware.

It will be appreciated that the foregoing description relates to a new data encryption system encryption in which obfuscation is performed using a distortion-inducing amplitude of light or analogous concept which, in an embodiment, relates to various wavelengths of light in a non-uniform manner.

This new encryption system has been described, above, in terms of several concrete implementations; the person familiar with this field will find other specific implementations to be achievable and well within the scope of the appended claims.

What is claimed is:

1. A system comprising:
a transmission encoder; and
a transmission decoder;
wherein the transmission encoder comprises:
a first receiver configured to receive a data stream to be encoded as a received data stream;
a segmenter, implemented by a hardware processor, configured to segment the data stream into a plurality of discrete portions;
a first input converter configured to convert a given discrete portion of the plurality of discrete portions into a first light source control signal;
at least one first light source configured to emit light, in accordance with the first light source control signal, as a first light representing a value of the given discrete portion;
at least one first distortion-inducing light source configured to emit a first distortion-inducing light;
a first light containment cavity configured to relate the first light with the first distortion-inducing light to produce a related light;
at least one first light sensor configured to output a first light amplitude representation signal in response to sensing the related light; and
a first output converter configured to convert the first light amplitude representation signal to a digital signal; and
wherein the transmission decoder comprises:
a second receiver configured to receive the digital signal;
a second input converter configured to convert the digital signal into a second light source control signal;
at least one second distortion-inducing light emitted by at least one second distortion-inducing light source, the second distortion-inducing light having properties identical to those of the first distortion-inducing light;
a controller configured to control at least one second light source to emit light as a second light, the controller further configured control the at least one second light source to vary an amplitude of the second light, taking into account a presence of the second distortion-inducing light, so the amplitude of the second light is varied until a cumulative amplitude of the second light and the second distortion-inducing light matches the amplitude represented in the second light source control signal;
a second light containment cavity configured to contain the second light and the second distortion-inducing light;
at least one second light sensor configured to sense the cumulative amplitude of the second light and the second distortion-inducing light, wherein following sensing of the amplitude represented in the second light source control signal, an input value to the at least one second light source is determined as a second light amplitude representation signal; and
a second output converter configured to convert the second light amplitude representation signal into the given discrete portion of the data stream.

2. The system according to claim 1, wherein the first distortion-inducing light relates to different wavelengths of light emitted by the at least one first light source in a non-uniform manner.

3. The system according to claim 1, wherein the segmenter is configured to segment the received data stream by:
extracting at least one packet payload from at least one packet;
dropping a header and a footer of the at least one packet, if present;
segmenting the packet payload into one or more discrete portions of the plurality of discrete portions according to a predetermined segmenting size; and
providing the one or more discrete portions of the plurality of discrete portions to the first input converter.

4. The system according to claim 1, wherein the at least one first light source and the at least one second light source are light emitting diodes.

5. The system according to claim 1, wherein the at least one first light source and the at least one second light source are coherent light sources.

6. An encoder comprising:
a receiver configured to receive a data stream to be encoded as a received data stream;
a segmenter, implemented by a hardware processor, configured to segment the received data stream into a plurality of discrete portions;
an input converter configured to convert a given discrete portion of the plurality of discrete portions into a light source control signal;
at least one light source configured to emit light, in accordance with the light source control signal, as a first light representing a value of the given discrete portion;
at least one distortion-inducing light source configured to emit distortion-inducing light;
a light containment cavity configured to relate the first light with the distortion-inducing light to produce a related light at a respective related light amplitude;
at least one light sensor configured to output a light amplitude representation signal in response to sensing the related light; and
an output converter configured to convert the light amplitude representation signal to a digital signal.

7. The encoder according to claim 6 wherein the at least one light source and the at least one light sensor are provided at least partially on an inner surface of the light containment cavity.

8. The encoder according to claim 6, wherein in the light containment cavity, the at least one light sensor and the at least one light source are provided within a same hemisphere of an inner surface of the light containment cavity.

9. The encoder according to claim 6, wherein the light containment cavity is formed in a plurality of adjacent substrates.

10. The encoder according to claim 6, wherein the light containment cavity is formed by a polyhedron shape and has a plurality of flat interior surfaces.

11. The encoder according to claim 6, wherein all interior space of the light containment cavity is free of interposed components.

12. An apparatus comprising:
a receiver, an input converter, a controller, a distortion-inducing light source, an emission light source, a light containment cavity, a light sensor, an output converter, and an output circuit;

the receiver configured to receive encrypted digital data;
the input converter configured to convert the encrypted digital data into a light source control signal having a light source control signal amplitude;
the distortion-inducing light source configured to emit a distortion-inducing light;
the controller configured to control the emission light source to emit an emitted light, the emitted light having an emitted light amplitude;
the light sensor configured to sense a combination of the distortion-inducing light and the emitted light, within the light containment cavity, as a combined light, the combined light having a combined light amplitude;
the controller further configured to control the emission light source to vary the emitted light amplitude to reach a matched light amplitude so the combined light amplitude matches the light source control signal amplitude;
the controller further configured to output a light amplitude representation signal based on one of: the matched light amplitude, and a value input to the emission light source to achieve the matched light amplitude;
the output converter configured to convert the light amplitude representation signal into digital format data; and
the output circuit configured to output the digital format data as decrypted data corresponding to the encrypted digital data.

13. The apparatus according to claim 12 wherein the emission light source and the light sensor are at least partially on an inner surface of the light containment cavity.

14. The apparatus according to claim 12, wherein in the light containment cavity, the emission light source and the light sensor are within a same hemisphere of an inner surface of the light containment cavity.

15. The apparatus according to claim 12, wherein the light containment cavity is formed in a plurality of adjacent substrates.

16. The apparatus according to claim 12, wherein the light containment cavity is formed by a polyhedron shape and has a plurality of flat interior surfaces.

17. The apparatus according to claim 12, wherein all interior space of the light containment cavity is free of interposed components.

18. A method comprising:
receiving a data stream to be encoded as a received data stream;
segmenting the received data stream, via a hardware processor, into a plurality of discrete portions;
converting a given discrete portion of the plurality of discrete portions into a light source control signal;
emitting a first light in accordance with the light source control signal, the first light representing a value of the given discrete portion;
emitting a distortion-inducing light;
relating the first light with the distortion-inducing light in a light containment cavity to produce a related light at a respective light amplitude;
sensing the related light with at least one light sensor;
outputting a light amplitude representation signal in response the sensing;
converting the light amplitude representation signal to a digital signal; and
outputting the digital signal.

19. A data decryption method, comprising:
receiving encrypted digital data;
converting the encrypted digital data into a light source control signal having a light source control signal amplitude;
emitting a distortion-inducing light and a light emitted by a first light into a light containment cavity to obtain combined light, the light emitted by the first light having an emitted light amplitude;
sensing a combined light amplitude of the combined light;
varying the emitted light amplitude until reaching a matching point at which the combined light amplitude matches the light source control signal amplitude, using the combined light amplitude as feedback;
determining, when the matching point is reached, an input value of the first light;
converting the input value of the first light to a light amplitude representation signal; and
converting the light amplitude representation signal to decrypted digital data corresponding to the encrypted digital data.

20. A system comprising:
a transmission encoder; and
a transmission decoder;
wherein the transmission encoder comprises:
  a first receiver configured to receive a data stream to be encoded as a received data stream;
  a segmenter, implemented by a hardware processor, configured to segment the received data stream into a plurality of discrete portions;
  a first input converter configured to convert a given discrete portion of the plurality of discrete portions into a first light source control signal;
  at least one first light source configured to emit light, in accordance with the first light source control signal, as a first light representing a value of the given discrete portion;
  at least one first distortion-inducing light source configured to emit a first distortion-inducing light;
  a first light containment cavity configured to relate the first light with the first distortion-inducing light to produce a related light;
  at least one first light sensor configured to output a first light amplitude representation signal in response to sensing the related light; and
  a first output converter configured to convert the first light amplitude representation signal to a digital signal; and
wherein the transmission decoder comprises:
  a second receiver configured to receive the digital signal;
  a second input converter configured to convert the digital signal into a second light source control signal;
  a look-up table comparison processor which compares the second light source control signal with a look-up table, to produce a second light amplitude representation signal; and
  a second output converter configured to convert the second light amplitude representation signal into the given discrete portion of the data stream.

* * * * *

UNITED STATES PATENT AND TRADEMARK OFFICE
CERTIFICATE OF CORRECTION

PATENT NO. : 10,225,077 B1
APPLICATION NO. : 15/882760
DATED : March 5, 2019
INVENTOR(S) : Joshua Norman Smith and Robert Chad McCollum It is certified that error appears in the above-identified patent and that said Letters Patent is hereby corrected as shown below:

In the Specification

Column 1, under Cross-Reference to Related Application, at Line 10, after the word "and" insert
--U.S. patent application Ser. No. 14/995,888 also claims the benefit of--

Signed and Sealed this
Thirtieth Day of April, 2019

Andrei Iancu
*Director of the United States Patent and Trademark Office*